United States Patent
Hung

(10) Patent No.: US 6,501,199 B2
(45) Date of Patent: Dec. 31, 2002

(54) AUTOMATIC WHEEL-DRIVEN GENERATING MEANS AND LIGHTING DEVICE THEREOF

(76) Inventor: Pao-chuang Hung, No. 91, Sec. 2, Tzu Chiang Rd., Sanchung City, Taipei Hsien (TW)

(*) Notice: Subject to any disclaimer, the term of this patent is extended or adjusted under 35 U.S.C. 154(b) by 0 days.

(21) Appl. No.: 09/813,786

(22) Filed: Mar. 22, 2001

(65) Prior Publication Data

US 2002/0136020 A1 Sep. 26, 2002

(51) Int. Cl.[7] .................. H02K 21/22; B62J 6/12
(52) U.S. Cl. ............... 310/67 A; 310/263; 310/154.04; 310/154.44; 362/192; 362/473
(58) Field of Search .................. 362/192, 193, 362/473, 474, 475, 476, 511, 500, 551, 558, 582; 310/67 A, 62 A, 257, 75 C, 263, 154.44, 154.03, 154.04

(56) References Cited

U.S. PATENT DOCUMENTS

| 4,191,988 A | * | 3/1980 | Kumakura | 362/72 |
| 4,227,105 A | * | 10/1980 | Kumakura | 310/153 |
| 4,725,928 A | * | 2/1988 | Strepek | 362/78 |
| 4,860,176 A | * | 8/1989 | Bauwens et al. | 362/72 |
| 5,984,487 A | * | 11/1999 | McGhee | 362/72 |

FOREIGN PATENT DOCUMENTS

JP   57-59461   *  4/1982   ......... H02K/21/06

* cited by examiner

Primary Examiner—Karl Tamai
(74) Attorney, Agent, or Firm—Bacon & Thomas

(57) ABSTRACT

An automatic wheel-driven generating device mainly includes a base fixedly mounted on a wheel around an axle thereof and provided with a centered hollow column and one or more radially extended hollow pipes for each receiving a light-emitting element therein; a winding reel enclosed between left and right magnetic poles and fixedly mounted on the hollow column; and a magnet holder having a cap screwed into a center thereof and being fixedly mounted on the axle. The magnet holder carries magnets and is associated with the winding reel and the magnetic poles without contact with them. When the wheel rotates, the winding reel and the magnetic poles on the base rotate along with the wheel relative to the magnet holder that is unmovably fixed on the axle, so that an induced current is produced to drive the light-emitting elements to emit light beams. Each of the light-emitting elements is associated with a light-guiding bar that is connected to the wheel and has an uneven outer surface, so that light emitted from the light-emitting element is reflected and refracted in the light-guiding bar, making the whole rotating wheel a bright light circle to ensure a rider's safety.

25 Claims, 13 Drawing Sheets

AUTOMATIC WHEEL-DRIVEN GENERATING MEANS AND LIGHTING DEVICE THEREOF

FIELD OF THE INVENTION

The present invention relates to an automatic wheel-driven generating means and a lighting device thereof. The generating means mainly includes a base fixedly mounted on a wheel around an axle thereof and provided with a centered hollow column and one or more radially extended hollow pipes for each receiving a light-emitting element therein; a winding reel enclosed between left and right magnetic poles and fixedly mounted on the hollow column; and a magnet holder having a cap screwed into a center thereof and being fixed to and around the axle by extending the axle through an axle hole centered at the cap. The magnet holder carries magnets and is associated with the winding reel and the magnetic poles without contact with them. When the wheel rotates, the winding reel and the magnetic poles on the base rotate along with the wheel relative to the magnet holder that is unmovably fixed on the axle, so that an induced current is produced to drive the light-emitting elements to emit light beams. The lighting device includes one or more light-guiding bars that are connected to the wheel and separately associated with the light-emitting elements. The light-guiding bars have uneven outer surfaces, so that light beams emitted from the light-emitting elements are reflected and refracted in the light-guiding bars.

BACKGROUND OF THE INVENTION

For a rider to ride a bicycle safely in dark places, a generating means is developed for mounting on an axle of a wheel to generate current when the wheel rotates. The generated current drives a light-emitting element connected to the generating means to emit light. Such conventional wheel-driven generating means is usually bulky and heavy and includes bearings that complicate the assembling of the generating means. The bearings also increase overall dimensions at the axle of the wheel to which the generating means is mounted, forming an unpleasant vision that reduces a consumer's interest in buying the bicycle.

Meanwhile, the conventional wheel-driven generating means usually includes a lighting device that has complicate structure and provides only light beams of low brightness.

It is therefore tried by the inventor to develop an improved automatic wheel-driven generating means and a lighting device thereof to eliminate the drawbacks existing in the conventional wheel-driven generating means.

SUMMARY OF THE INVENTION

A primary object of the present invention is to provide an automatic wheel-driven generating means that is mounted on a wheel to generate electric currents without the need of bearings. The omission of the bearings enables the automatic wheel-driven generating means to be easily assembled and have reduced volume and weight. When the wheel rotates, the automatic wheel-driven generating means generates electric currents to drive light-emitting elements provided thereon to emit light beams.

Another object of the present invention is to provide a lighting device for the above-described automatic wheel-driven generating means. The lighting device includes one or more light-guiding bars that have specially designed uneven outer surface, so that light beams emitted from light-emitting elements on the generating means are reflected and refracted in the light-guiding bars to produce multiple light spots from one single light source. The multiple light spots on a rotating wheel make the wheel a bright light circle that is helpful in ensuring a rider's safety.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
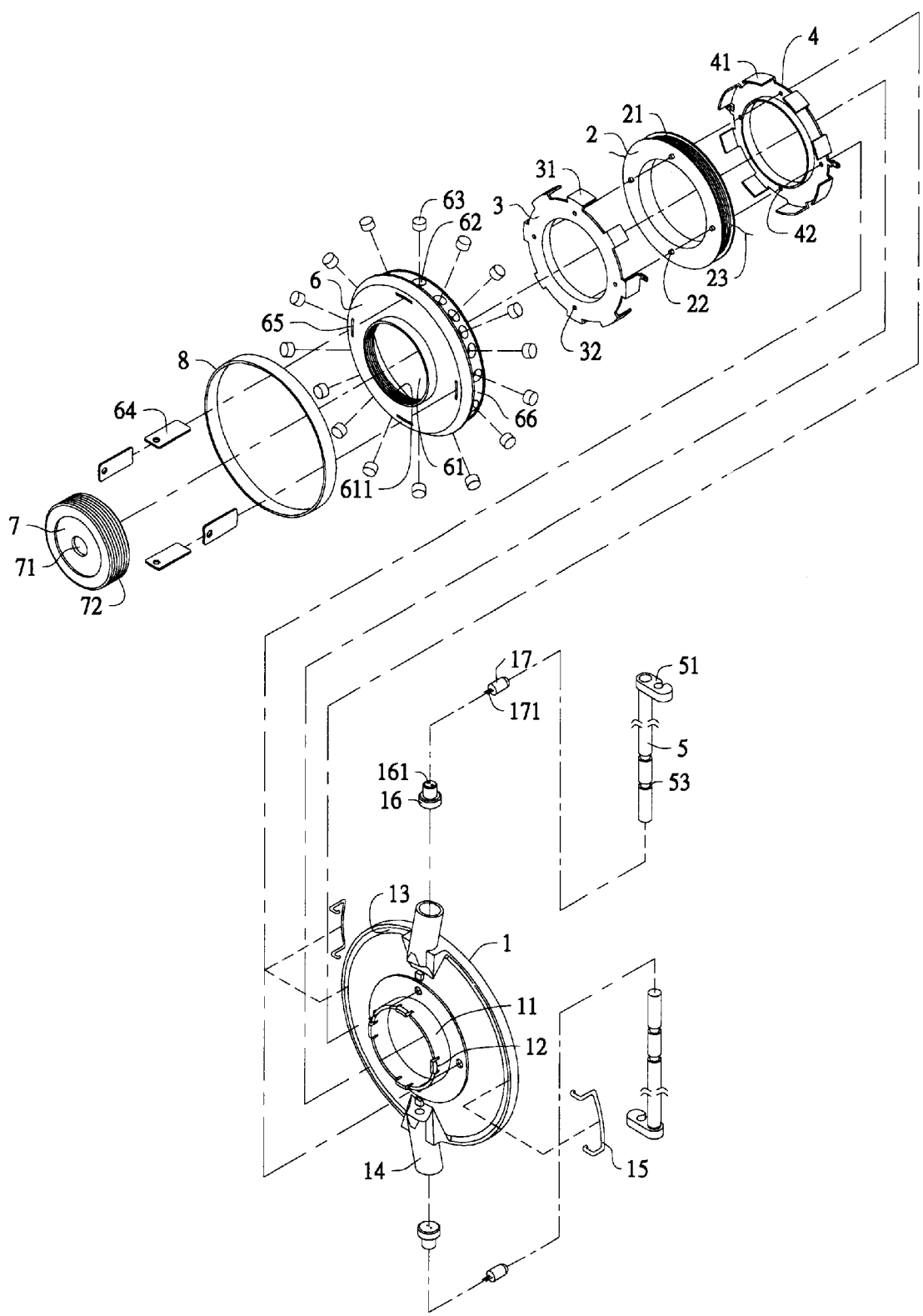
FIG. 1 is an exploded perspective of a first embodiment of the present invention.
Figure 2:
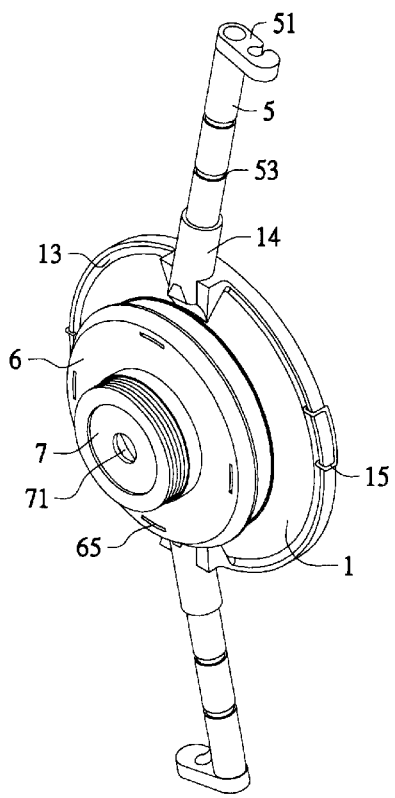
FIG. 2 is an assembled perspective of FIG. 1.
Figure 3:
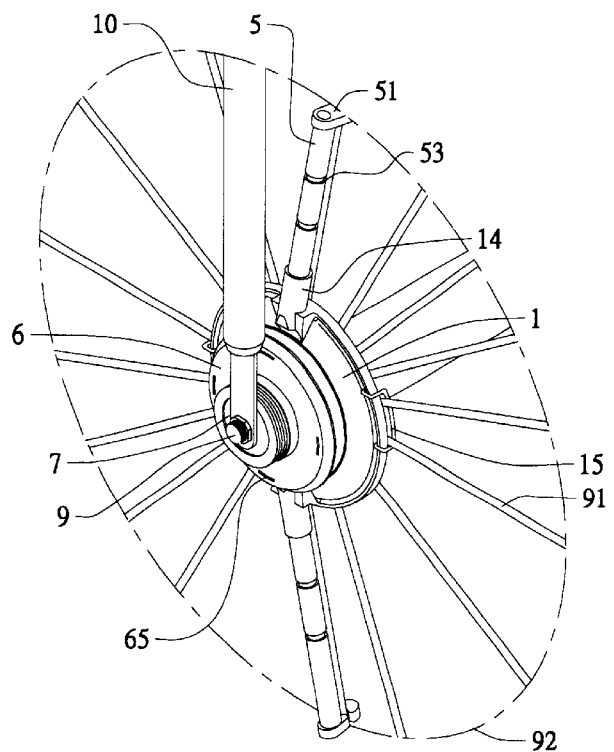
FIG. 3 is a perspective showing the present invention of FIG. 1 is mounted on an axle of a wheel.
Figure 4:
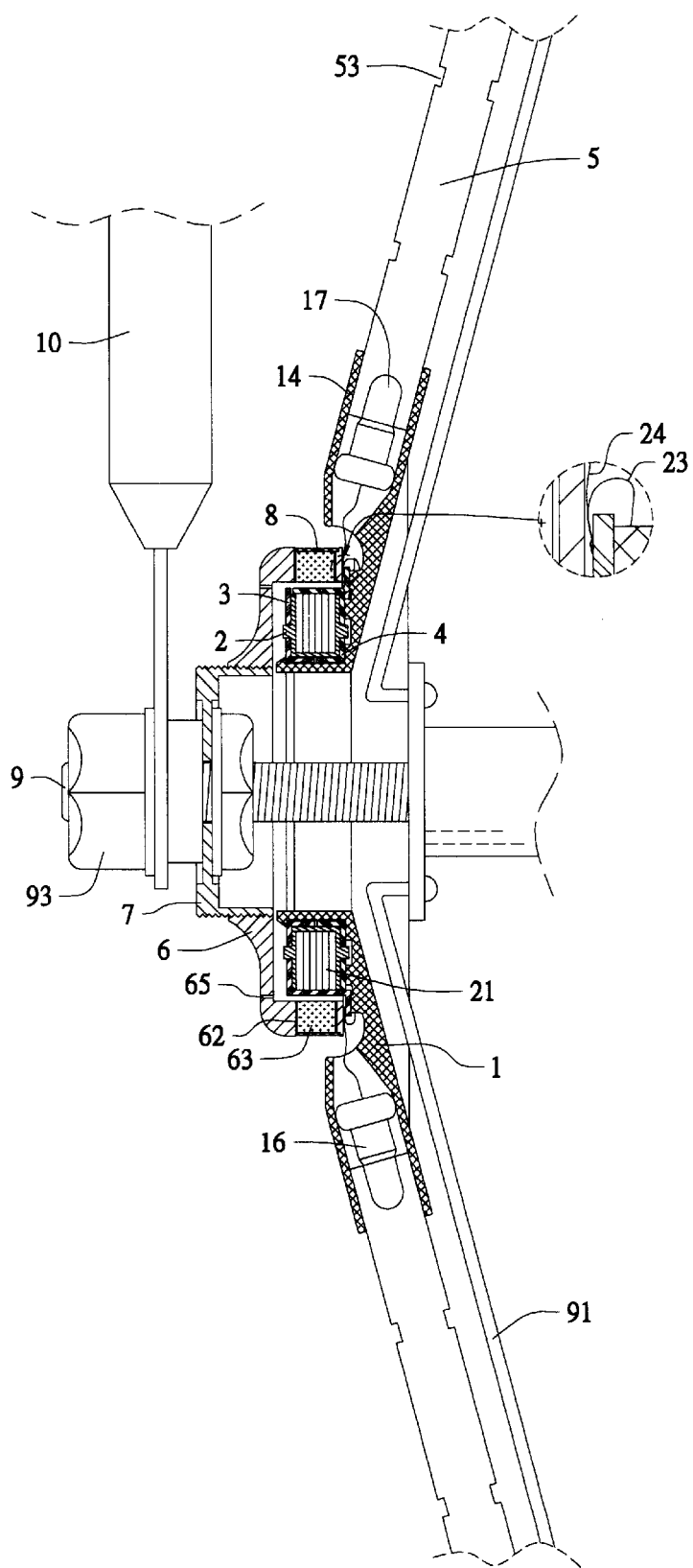
FIG. 4 is a sectional view showing the present invention of FIG. 1 is mounted on an axle of a wheel.
Figure 7:
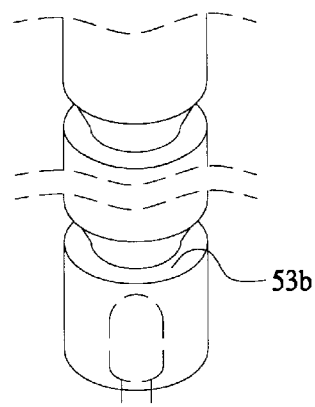
FIG. 7 shows a third embodiment of the light-guiding bar of the present invention.

Please refer to FIGS. 1 through 4 in which an automatic wheel-driven generating means according to a first embodiment of the present invention is shown. The automatic wheel-driven generating means mainly includes a base 1, a winding reel 2, left and right magnetic poles 3 and 4, two light-guiding bars 5, a magnet holder 6, a cap 7, and a magnet-isolating ring 8.

The base 1 is provided at a central area with an outward projected hollow column 11 through which an axle 9 of a wheel is extended. The hollow column 11 is provided along an outer rim thereof with several spaced and outward extended catches 12. The base 1 is provided on an outer side adjacent to a peripheral edge thereof with an annular groove 13. Two hollow pipes 14 are fixedly provided on the outer side of the base 1 to radially project from the peripheral edge of the base 1. The base is preferably mounted on the wheel with two retaining members 15, so that the base 1 is located around an axle 9 of the wheel. To do so, first extend an end of the retaining member 15 into the groove 13, and then guide the other end of the retaining member 15 through one or more spokes 91 of the wheel to return to the groove 13, and then extend the other end of the retaining member 15 into the groove 13, too. Repeat the same procedures for the other retaining member 15, so that it is located on the base 1 at a distance from the first retaining member 15. Each of the two hollow pipes 14 has a plug 16 disposed therein. The plug 16 is provided with two through holes 161 into which two pins 171 of a light-emitting element 17 are extended, so that the light-emitting element 17 is also located in the hollow pipe 14. The light-emitting element 17 may be a monochromatic or a multi-colored light-emitting element.

The winding reel 2 has a substantially I-shaped cross section for a winding coil 21 to form therearound. The winding reel 2 is provided at two sides with a plurality of spaced locating lugs 22. Lead-out wires 23 of the winding coil 21 are connected to two wires 24, and the wires 24 are further connected to the pins 171 of the light-emitting elements 17 disposed in the hollow pipes 14.

The left and the right magnetic poles 3 and 4 are two toroidal members disposed at two sides of the winding reel 2. The two magnetic poles 3, 4 respectively have a plurality of equally spaced magnetic pole fins 31, 41 axially extended from an outer peripheral edge toward the winding reel 2, so that the magnetic pole fins 31, 41 alternate along an outer periphery of the winding reel 2. The left and the right magnetic poles 3, 4 are provided along their annular surfaces with a plurality of through holes 32, 42 for engaging with the locating lugs 22 on the winding reel 2, so that the winding reel 2 is firmly enclosed between the two magnetic poles 3, 4. An assembly of the winding reel 2 and the left and the right magnetic poles 3, 4 is put around the hollow column 11 on the base 1 and is securely held thereto by the catches 12.

The two light-guiding bars 5 form a lighting device of the automatic wheel-driven generating means of the present invention. Each of the two light-guiding bars 5 has an inner end inserted into the hollow pipe 14. The inner end of the light-guiding bar 5 is provided with a cavity for receiving the light-emitting element 17 therein. An outer end of the light-guiding bar 5 is provided with a hooked head 51 that is adapted to press against a rim 92 of the wheel while hooking up a spoke 91, so that the light-guiding bar 5 is fixed in place on the wheel.

The magnet holder 6 is an annular member having a round central bore 61 provided with an internal screw thread 611. A circumferential edge 66 of the magnet holder 6 is formed with a plurality of holes 62 for each receiving a magnet 63 therein.

The cap 7 has a central axle hole 71 for the axle 9 to extend therethrough, so that the cap 7 is fixedly mounted on the axle 9. The cap 7 is provided around a circumferential surface with an external screw thread 72 for engaging with the internal screw thread 611 of the magnet holder 6, so that the magnet holder 6 is also fixedly mounted on the axle 9.

The magnet-isolating ring 8 is mounted around the circumferential edge 66 of the magnet holder 6 to prevent the magnets 63 from magnetically attracting external impurities.

The magnet holder 6 is to be located around the assembly of the winding reel 2 and the magnetic poles 3, 4 without contacting with the assembly. To do so, first insert isolating plates 64 into slots 65 provided on a side surface of the magnet holder 6, so that the assembly of the winding-reel 2 and the magnetic poles 3, 4 is located in the magnet holder 6 without contacting with the magnet holder 6. After the magnet holder 6 has been adjusted into a correct position to align the magnets 63 with the magnetic pole fins 31, 41 of the left and the right magnetic poles 3, 4, the isolating plates 64 are removed from the slots 65. Finally, connect an outer end of the axle 9 to a fork 10 and use a nut 93 to lock the axle 9 and the fork 10 together.

When the wheel rotates, it brings the base 1 and accordingly the assembly of the winding reel 2 and the left and the right magnetic poles 3, 4 mounted on the hollow column 11 of the base 1 to rotate at the same time. On the other hand, the magnet holder 6, which is fixedly mounted on the axle 9 through the cap 7, does not rotate with the wheel. With the magnetic poles 3, 4 rotate relative to the magnets 63 on the magnet holder 6, an induced current is produced and supplied to the light-emitting elements 17 and drives the same to emit light beams.

Figure 5:
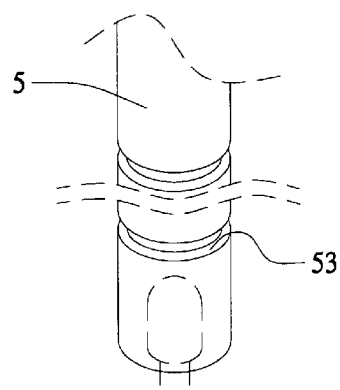
FIG. 5 shows a first embodiment of the light-guiding bar of the present invention.
Figure 8:
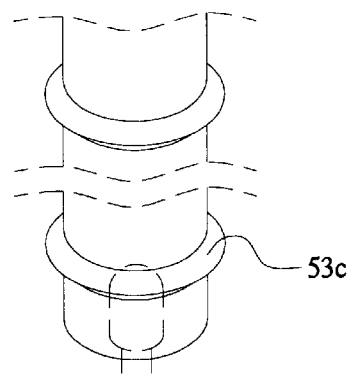
FIG. 8 shows a fourth embodiment of the light-guiding bar of the present invention.
Figure 6:
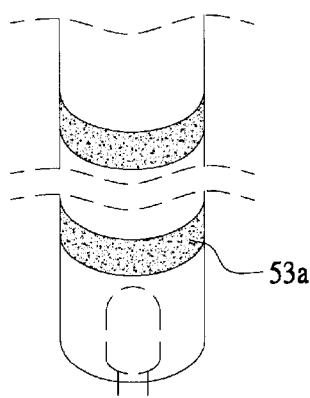
FIG. 6 shows a second embodiment of the light-guiding bar of the present invention.

Please refer to FIG. 5 that shows a first embodiment of the light-guiding bar 5. The light-guiding bar 5 is provided on an outer surface with several annular grooves 53 that cause the light beam emitted by the light-emitting element 17 to pass interfaces between different mediums and thereby be reflected and refracted in the light-guiding bar 5, enabling production of multiple light spots from the one single light source of the light-emitting element 17. When a multi-colored light-emitting element 17 is used, a large number of combinations of different colors with different number of light spots could be created. Moreover, brightness of light at the annular grooves 53 is higher than that of light shown on a smooth surface of a light-guiding bar without the annular grooves 53. Since the light-guiding bar 5 is securely located between the axle 9 and the rim 92 of a wheel as described above, it makes the rotating wheel a highly bright light circle. This highly bright light circle of the rotating wheel serves as a warning sign to ensure the safety of a rider riding in dark places. It is also possible to connect the light-emitting element 17 to a flashing circuit (not shown), so that the wheel flashes while rotating to provide more significant warning and increased safety of riding.

Please refer to FIGS. 5 through 8. In addition to the annular grooves 53, the light-guiding bar 5 may also be provided at its outer surface with spaced coarse belts 53a, narrowed portions 53b, expanded portions 53c, etc. to achieve the same effect as that of the annular grooves 53.

In FIGS. 1 through 4, the magnet-isolating ring 8 is used to prevent the magnets 63 from magnetically attracting external impurities when the wheel rotates. And, the isolating plates 64 are used to prevent the magnets 63 from magnetically attracting the two magnetic poles 3, 4 to cause difficulty in centering the magnetic poles 3, 4 in the wheel for optimal operation. It is to be noted that the light-guiding bar 5 is made of a waterproof and dustproof material, and it together with the plug 16 in the hollow pipe 14 define a closed space between them to accommodate the light-emitting element 17 therein. The closed space protects the light-emitting element 17 against moisture and dust, enabling reduced failure and prolonged usable life of the light-emitting element 17.

Figure 9:
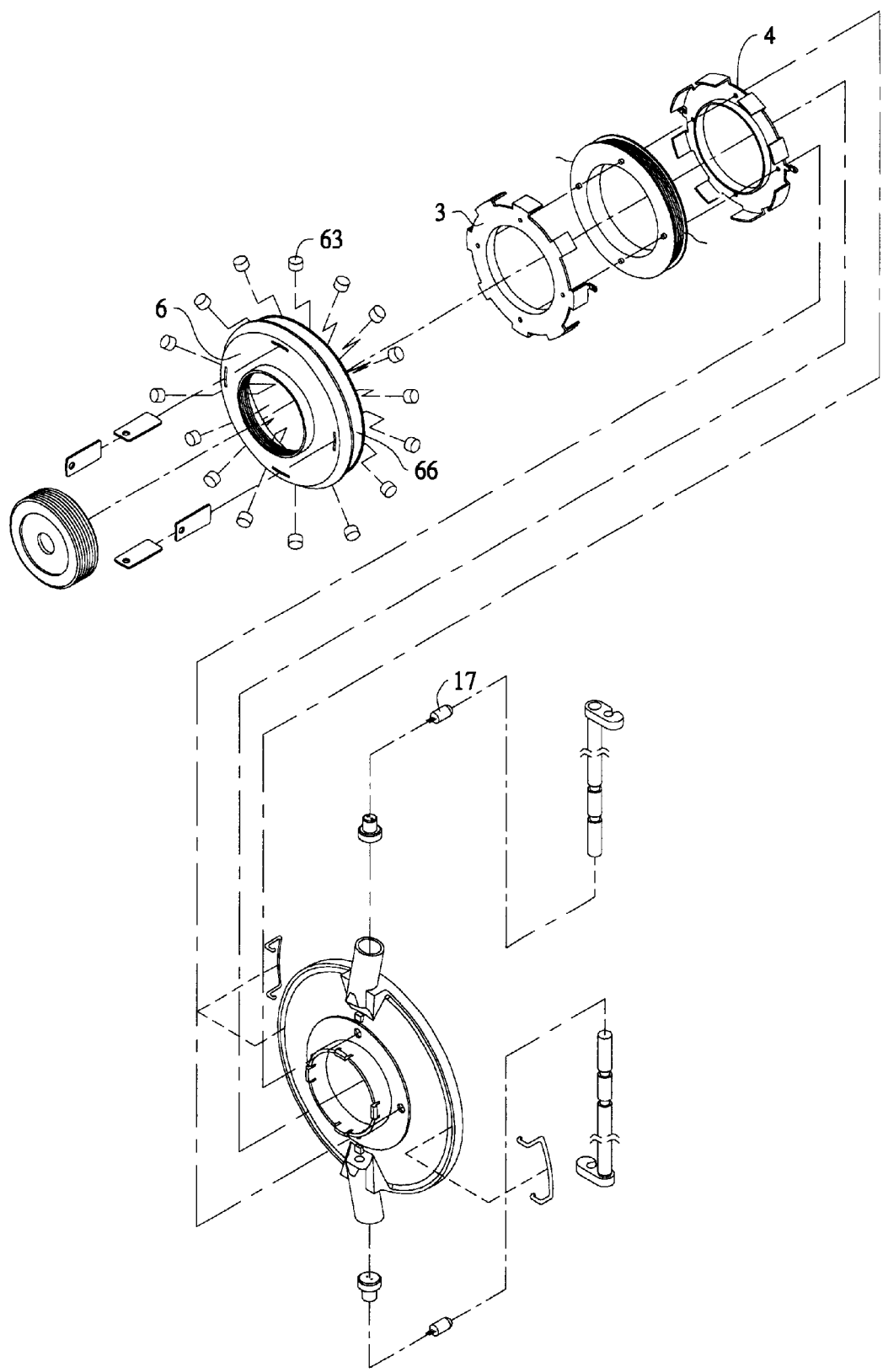
FIG. 9 is an exploded perspective of a second embodiment of the present invention.
Figure 10:
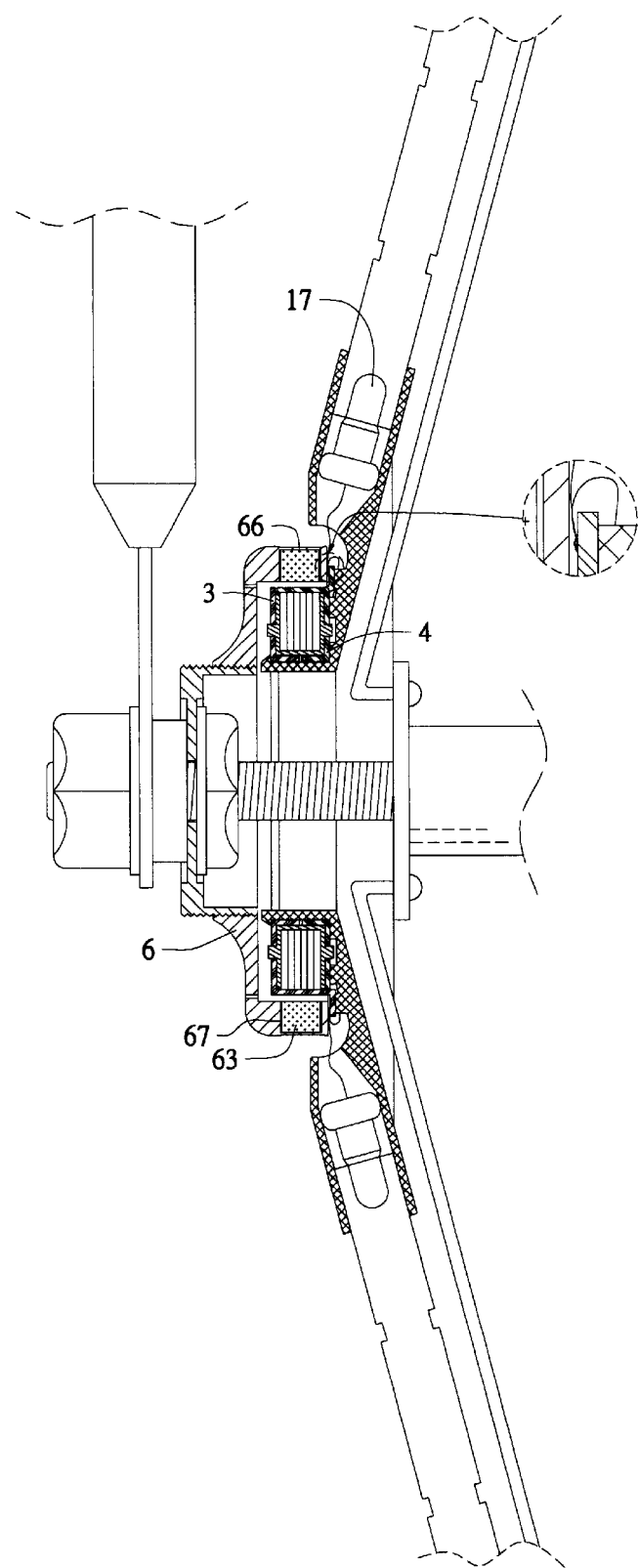
FIG. 10 is a sectional view showing the present invention of FIG. 9 is mounted on an axle of a wheel.
Figure 11:
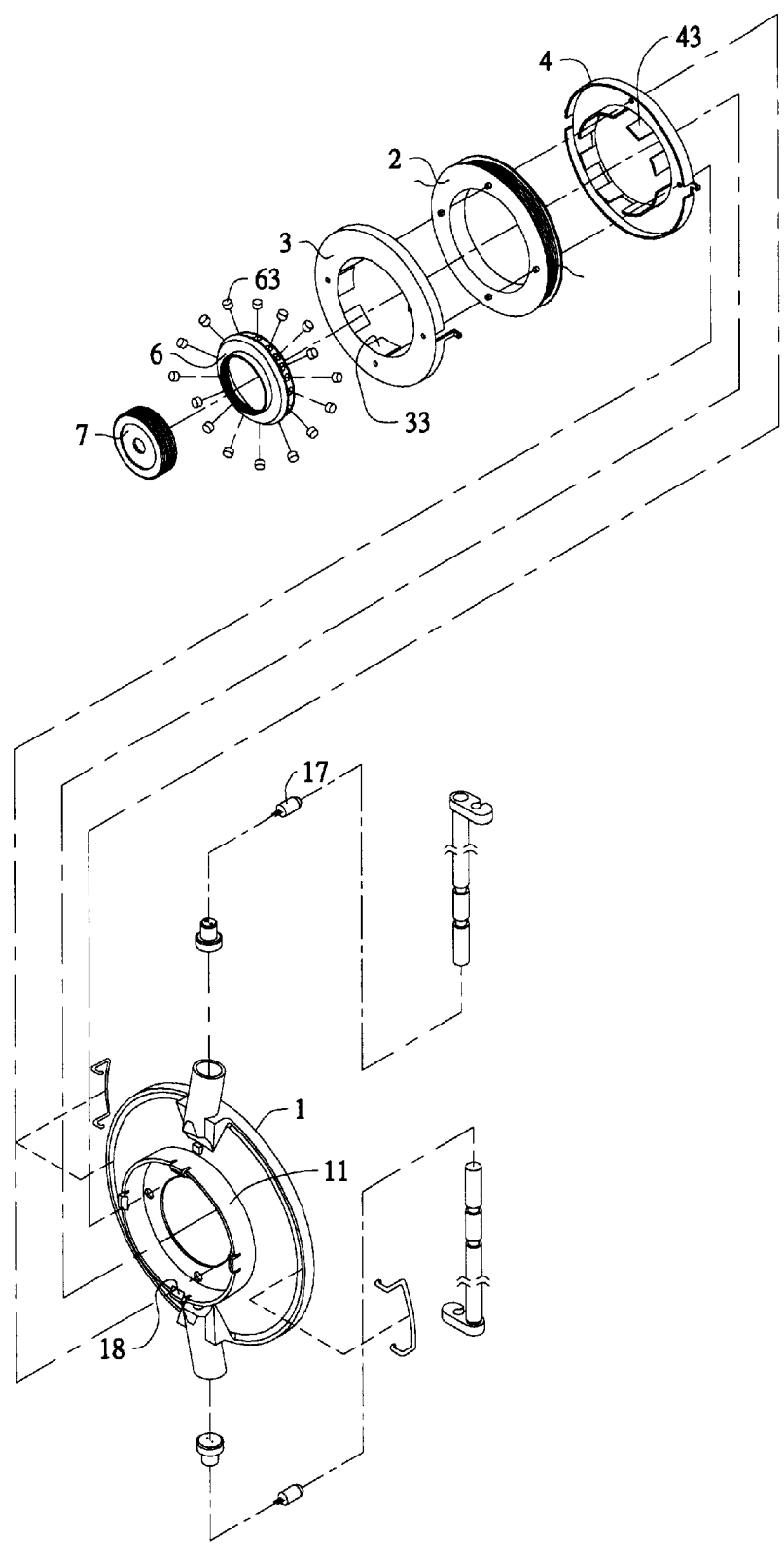
FIG. 11 is an exploded perspective of a third embodiment of the present invention.
Figure 12:
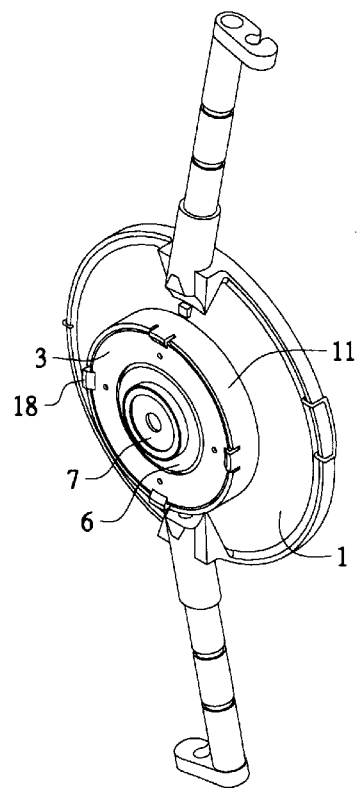
FIG. 12 is an assembled perspective of FIG. 11.
Figure 13:
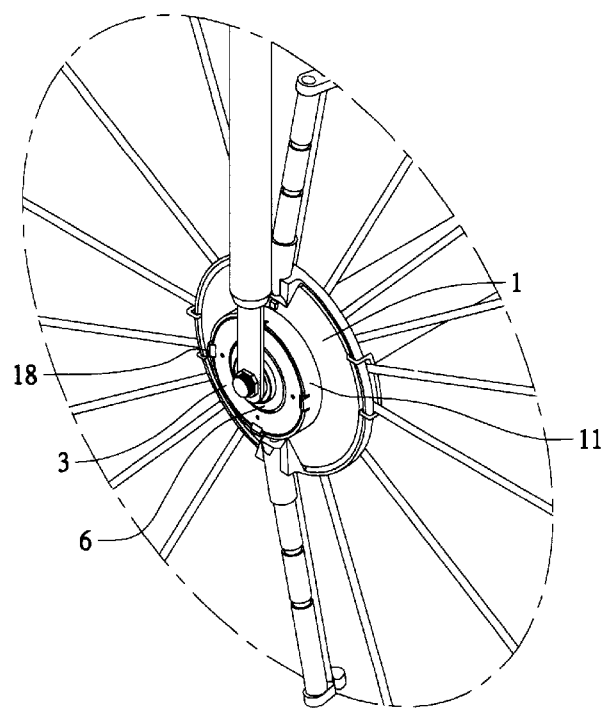
FIG. 13 is a perspective showing the present invention of FIG. 11 is mounted on an axle of a wheel.
Figure 14:
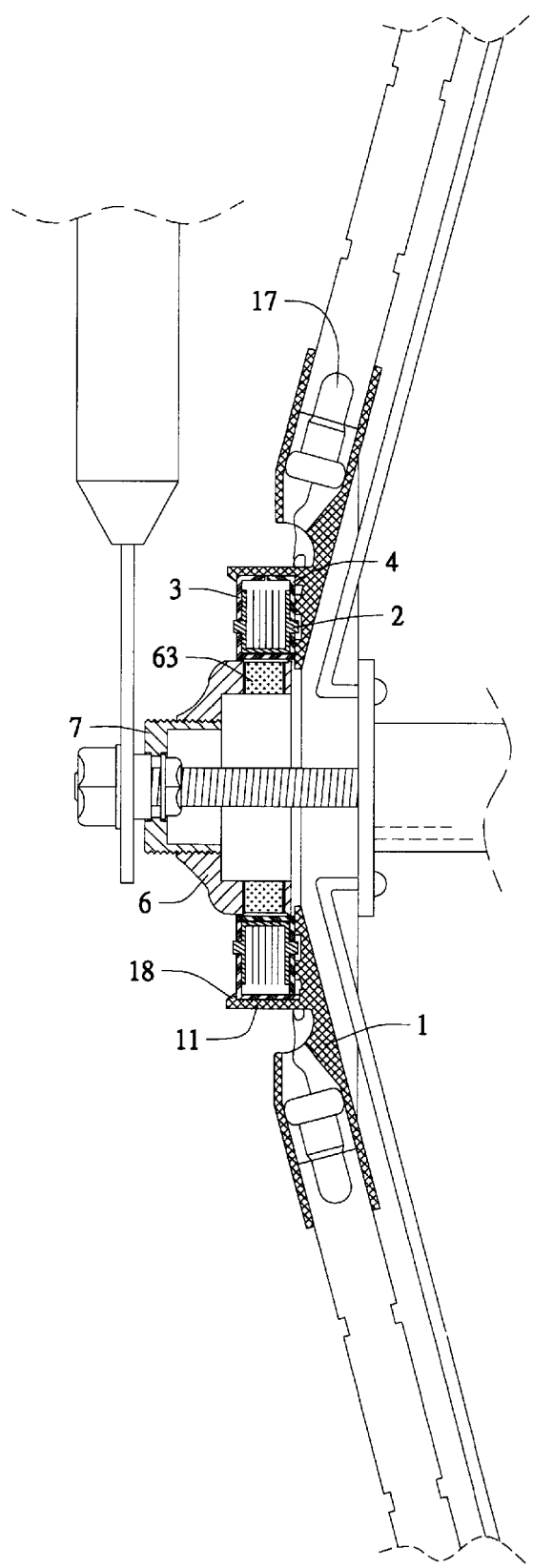
FIG. 14 is a sectional view showing the present invention of FIG. 11 is mounted on an axle of a wheel.

FIGS. 9 and 10 illustrates a second embodiment of the present invention that is generally similar to the first embodiment shown in FIGS. 1 through 8 except that the magnet holder 6 is provided at an inner side of the circumferential edge 66 with a plurality of recesses 67 for receiving the magnets 63 therein and the holes 62 are omitted. Again, the rotating of the magnetic poles 3, 4 relative to the magnets 63 received in the recesses 67 of the magnet holder 6 produces induced current that drives the light-emitting elements 17 to emit light. In this second embodiment, since the magnets 63 are not exposed from the magnet holder 6 to external environment, the magnet-isolating ring 8 is not needed and therefore omitted.

FIGS. 11 to 14 shows a third embodiment of the present invention that is also generally similar to the first embodiment in FIGS. 1 to 8, except that the hollow column 11 on the base 1 has an increased diameter, that the catches 12 are replaced with a plurality of spaced and inward extended catches 18 provided along an outer rim of the hollow column 11, that the left and the right magnetic poles 3, 4 are provided along an inner peripheral edge with a plurality of equally spaced magnetic pole fins 33, 43 axially extended toward the winding reel 2 to alternate, along an inner periphery of the winding reel 2 while the two magnetic poles 3, 4 enclosing the winding reel 2 between them, that an assembly of the two magnetic poles 3, 4 and the winding reel 2 is disposed in the hollow column 11 and held thereto by the catches 18, and that the magnet holder 6 and the cap 7 have reduced diameters to be disposed in a central opening defined by the assembly of the magnetic poles 3, 4 and the winding reel 2 without contacting with the assembly. Again, the rotating of the magnetic poles 3, 4 relative to the magnets 63 provided on the magnet holder 6 produces induced current that drives the light-emitting elements 17 to emit light. In this third embodiment, since the magnet holder 6 has reduced diameter and is disposed in the central opening of the magnetic poles 3, 4, the magnet-isolating ring 8 as well as the isolating plates 64 are not needed and therefore omitted.

Figure 15:
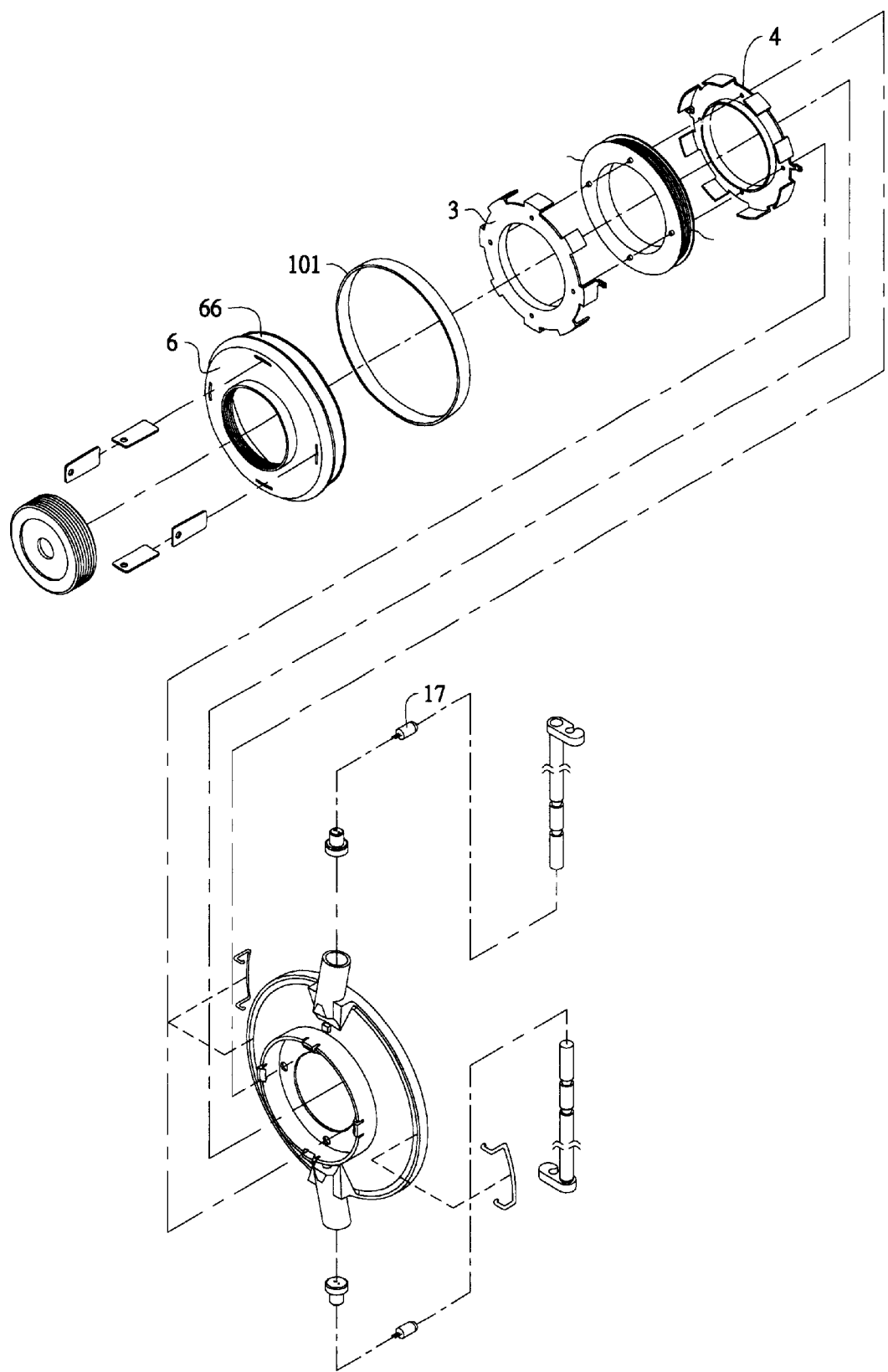
FIG. 15 is an exploded perspective of a fourth embodiment of the present invention.
Figure 16:
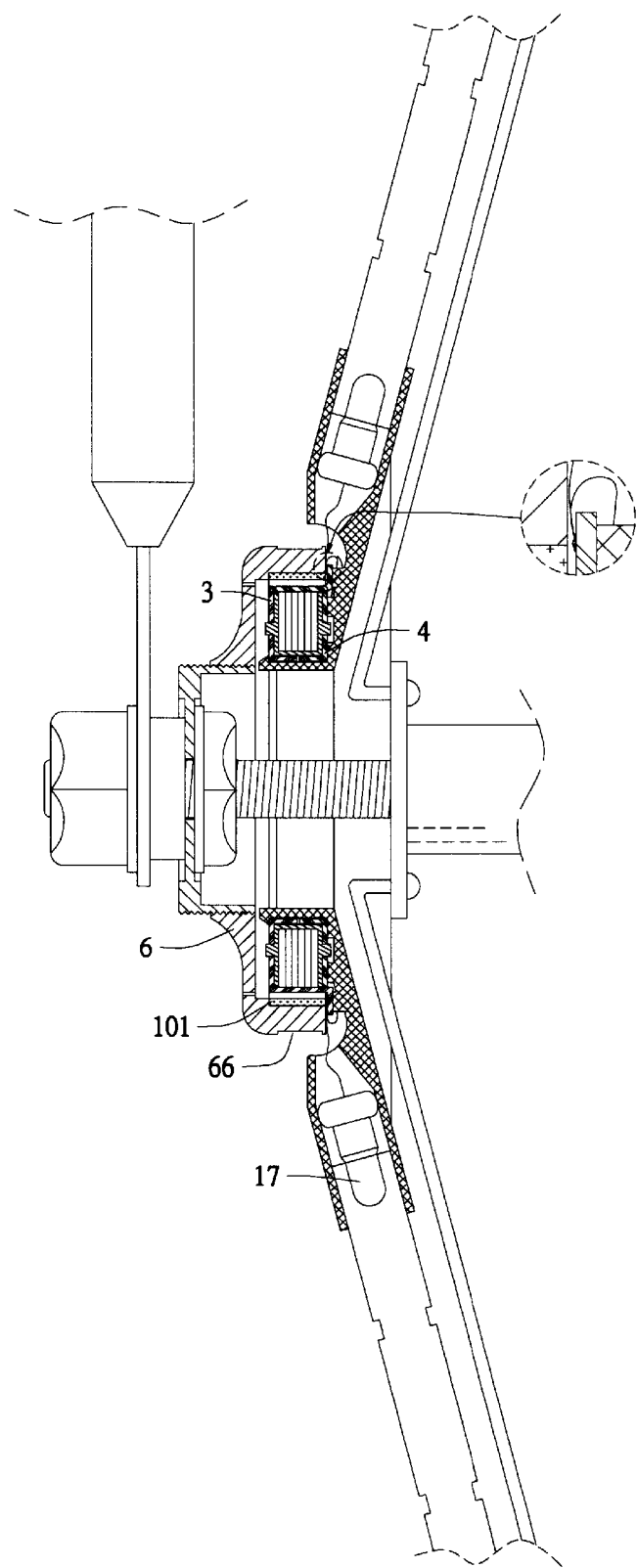
FIG. 16 is a sectional view showing the present invention of FIG. 15 is mounted on an axle of a wheel.

Please refer to FIGS. 15 and 16 in which a fourth embodiment of the present invention is shown. This fourth embodiment is also generally similar to the first embodiment in FIGS. 1 to 8, except that the magnets 63 are replaced with a magnetic ring 101 that is bonded around an inner side of the circumferential edge 66 of the magnet holder 6. Again, the rotating of the magnetic poles 3, 4 relative to the magnetic ring 101 on the magnet holder 6 produces induced current to drive the light-emitting elements 17 to emit light. In this fourth embodiment, since the magnetic ring 101 is not exposed from the magnet holder 6 to external environment, the magnet-isolating ring 8 is not needed and therefore omitted.

Figure 17:
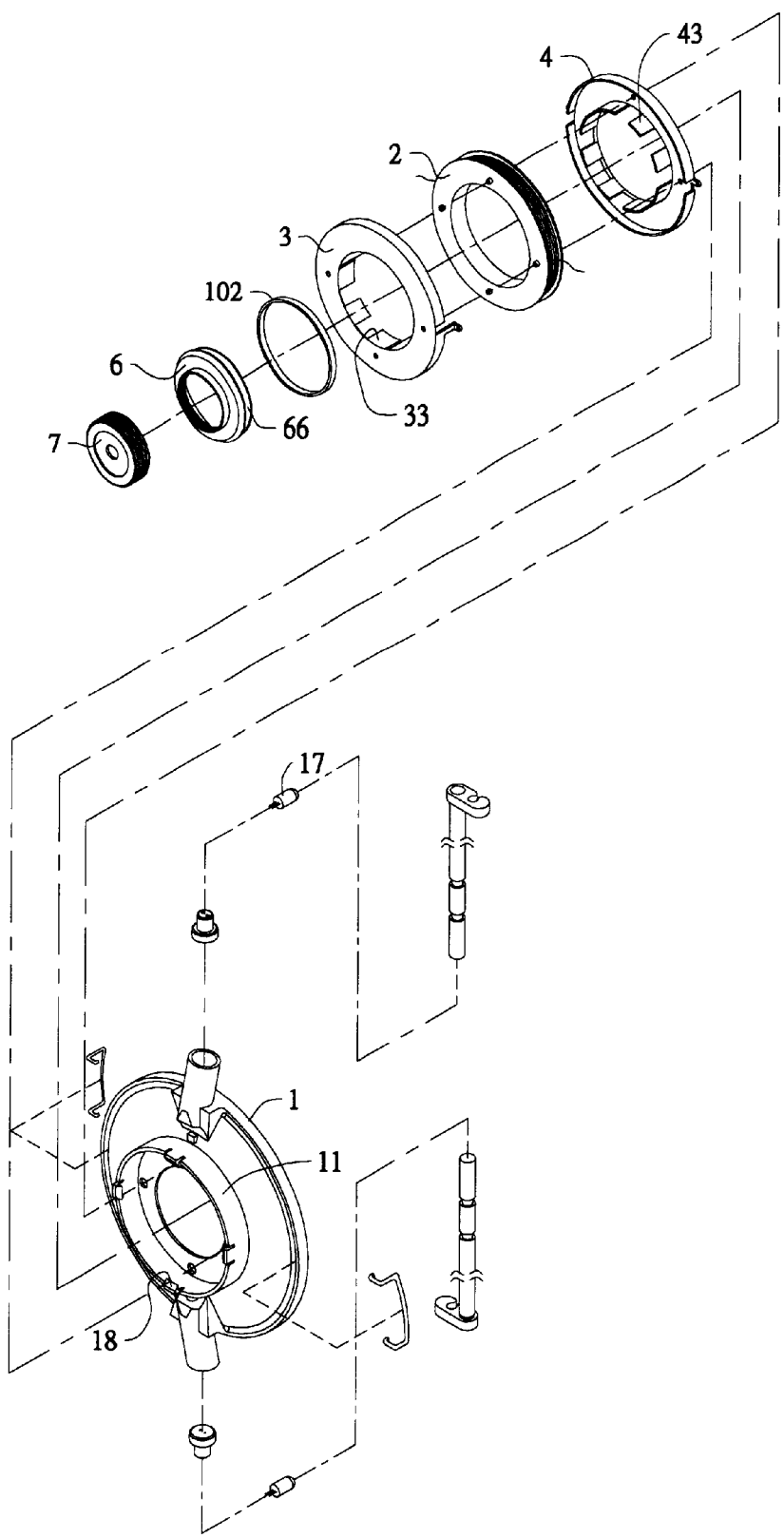
FIG. 17 is an exploded perspective of a fifth embodiment of the present invention.
Figure 18:
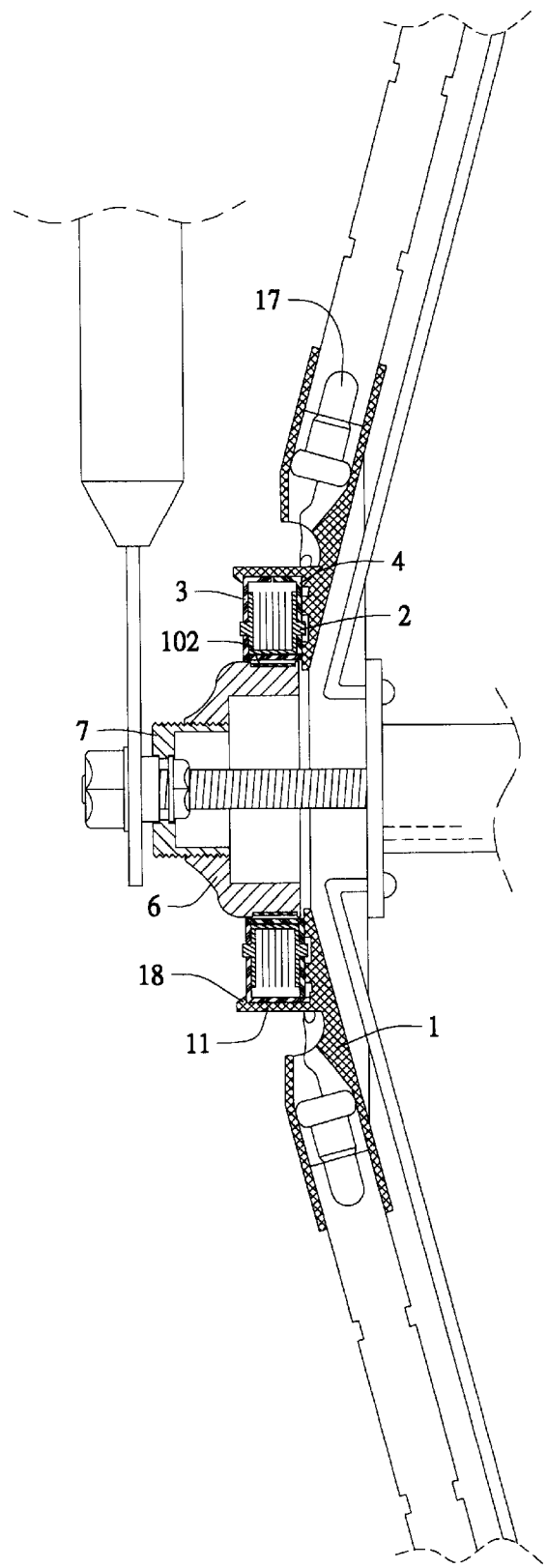
FIG. 18 is a sectional view showing the present invention of FIG. 17 is mounted on an axle of a wheel.

FIGS. 17 and 18 illustrates a fifth embodiment of the present invention that is also generally similar to the first embodiment in FIGS. 1 to 8, except that the hollow column 11 on the base 1 has an increased diameter, that the catches 12 are replaced with a plurality of spaced and inward extended catches 18 provided along an outer rim of the hollow column 11, that the left and the right magnetic poles 3,4 are provided along an inner peripheral edge with a plurality of equally spaced magnetic pole fins 33, 43 axially extended toward the winding reel 2 to alternate along an inner periphery of the winding reel 2 while the two magnetic poles 3, 4 enclosing the-winding reel 2 between them, that an assembly of the two magnetic poles 3, 4 and the winding reel 2 is disposed in the hollow column 11 and held thereto by the catches 18, that the magnet holder 6 and the cap 7 have reduced diameters to be located in a central opening defined by the assembly of the magnetic poles 3, 4 and the winding reel 2 without-contacting with the assembly, and that a magnetic ring 102 is bonded around the circumferential edge 66 of the magnet holder 6. Again, the rotating of the magnetic poles 3, 4 relative to the magnetic ring 102 provided on the magnet holder 6 produces induced current to drive the light-emitting elements 17 to emit light. In this fifth embodiment, since the magnet holder 6 has reduced diameter and is disposed in central opening of the magnetic poles 3, 4, the magnet-isolating ring 8 as well as the isolating plates 64 are not needed and therefore omitted.

In the above-described wheel-driven generating means, since the two magnetic poles 3, 4 rotate relative to the magnets 63 or the magnetic ring 101, 102, an induced current is produced to drive the light-emitting elements 17 to emit light beams without the need of mounting bearings, the wheel-driven generating means could therefore be more easily assembled and have further reduced volume and weight, making it excellently suitable for mounting on the axle of a bicycle wheel. Moreover, the automatic wheel-driven generating means of the present invention also has structurally simple lighting device that is able to produce highly bright light circles, making the present invention a novel and improved structure.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An automatic wheel-driven generating means, comprising a base, a winding reel, left and right magnetic poles, a magnet holder, and a cap;

said base being provided at a central area with an outward projected hollow column, at an outer side along a peripheral edge thereof with a groove, and on said outer side with one or more fixed hollow pipes radially project from said peripheral edge of said base, and said base being mounted on a wheel of around an axle thereof by retaining members;

said winding reel having a coil wound thereon, lead-out wires of said coil being separately connected to wires that are further separately connected to light-emitting elements disposed in said hollow pipes of said base;

said left and said right magnetic poles being two toroidal members located at two sides of said winding reel and having a plurality of equally spaced magnetic pole fins axially extended from an outer peripheral edge toward said winding reel, such that said magnetic pole fins alternate along an outer periphery of said winding reel to firmly enclose said winding reel between said left and said right magnetic poles, and an assembly of said winding reel and said left and said right magnetic poles being put around said hollow column on said base;

said magnet holder being an annular member having a round central bore and being located around said assembly of said winding reel and said left and said right magnetic poles without contacting with said assembly while a plurality of magnets held on said magnet holder corresponding to said magnetic pole fins of said left and said right magnetic poles; and said cap being engaged into said central bore of said magnet holder and having a central axle hole for said axle to extend therethrough, so that said cap and accordingly said magnet holder are fixedly mounted on said axle;

whereby when said wheel rotates, said left and said right magnetic poles mounted on said hollow column of said base rotate along with said wheel relative to said magnets on said magnet holder that is fixedly mounted on said axle without rotating along with said wheel, and an induced current is produced to drive said light-emitting elements to automatically emit light without the need of any battery.

2. The automatic wheel-driven generating means as claimed in claim 1, wherein said hollow column on said base is provided along an outer rim with a plurality of spaced and outward extended catches for securely holding said assembly of said winding reel and said left and said right magnetic poles around said hollow column.

3. The automatic wheel-driven generating means as claimed in claim 1, wherein said magnet holder is formed along a circumferential edge with a plurality of holes in which said a plurality of magnets are received.

4. The automatic wheel-driven generating means as claimed in claim 3, further comprising a magnet-isolating ring put around said circumferential edge of said magnet holder to prevent said magnets from magnetically attracting external impurities.

5. The automatic wheel-driven generating means as claimed in claim 1, wherein said magnet holder is provided at an inner side of a circumferential edge thereof with a plurality of recesses in which said a plurality of magnets are received.

6. The automatic wheel-driven generating means as claimed in claim 1, wherein said central bore of said magnet holder is provided with an internal screw thread and said cap is provided with an external screw thread, and said cap is axially adjustably connected to said central bore of said magnet holder through engagement of said external screw thread with said internal screw thread.

7. The automatic wheel-driven generating means as claimed in claim 1, wherein said base is fixedly mounted on said wheel around said axle by extending a first end of each of said retaining members into said groove provided on said base, and guiding a second end of each of said retaining members through one or more spokes of said wheel before extending said second end into said groove.

8. The automatic wheel-driven generating means as claimed in claim 1, wherein said magnet holder is mounted around said assembly of said winding reel and said left and said right magnetic poles without contacting with said assembly by inserting a plurality of isolating plates into a plurality of slots spaced on a side surface of said magnet holder before said magnet holder is put around said assembly, so that said magnets on said magnet holder and said magnetic poles do not magnetically attract one another before said magnet holder is correctly mounted on said axle, and said isolating plates being removed from said slots after said magnet holder having been correctly mounted on said axle.

9. The automatic wheel-driven generating means as claimed in claim 1, wherein each of said hollow pipes on said base has a plug disposed therein, said plug being provided with two holes for two pins of said light-emitting element to extend thereinto, so that said light-emitting element is protected against moisture and dust.

10. An automatic wheel-driven generating means, comprising a base, a winding reel, left and right magnetic poles, a magnet holder, and a cap;
    said base being provided at a central area with an outward projected hollow column, at an outer side along a peripheral edge thereof with a groove, and on said outer side with one or more fixed hollow pipes radially project from said peripheral edge of said base, and said base being fixedly mounted on a wheel around an axle thereof by retaining members;
    said winding reel having a coil wound thereon, lead-out wires of said coil being separately connected to wires that are further separately connected to light-emitting elements disposed in said hollow pipes of said base;
    said left and said right magnetic poles being two toroidal members located at two sides of said winding reel to enclose said winding reel between them, and having a plurality of equally spaced magnetic pole fins axially extended from an inner peripheral edge toward said winding reel, such that said magnetic pole fins alternate along an inner periphery of said winding reel, and an assembly of said winding reel and said left and said right magnetic poles being put in said hollow column on said base;
    said magnet holder being an annular member having a round central bore and being located in said assembly of said winding reel and said left and said right magnetic poles without contacting with said assembly, and a plurality of magnets being held in holes provided along a circumferential edge of said magnet holder corresponding to said magnetic pole fins of said left and said right magnetic poles; and
    said cap being engaging into said central bore of said magnet holder and having a central axle hole for said axle to extend therethrough, so that said cap is fixedly mounted on said axle;
    whereby when said wheel rotates, said left and said right magnetic poles mounted in said hollow column of said base rotate along with said wheel relative to said magnets on said magnet holder that is fixedly mounted on said axle through said cap, and an induced current is produced to drive said light-emitting elements to automatically emit light without the need of any battery.

11. The automatic wheel-driven generating means as claimed in claim 10, wherein said hollow column on said base is provided along an outer rim with a plurality of spaced and inward extended catches for securely holding said assembly of said winding reel and said left and said right magnetic poles in said hollow column.

12. The automatic wheel-driven generating means as claimed in claim 10, wherein said central bore of said magnet holder is provided with an internal screw thread and said cap is provided with an external screw thread, and said cap is axially adjustably connected to said central bore of said magnet holder through engagement of said external screw thread with said internal screw thread.

13. The automatic wheel-driven generating means as claimed in claim 10, wherein said base is fixedly mounted on said wheel around said axle by extending a first end of each of said retaining members into said groove provided on said base, and guiding a second end of each of said retaining members through one or more spokes of said wheel before extending said second end into said groove.

14. The automatic wheel-driven generating means as claimed in claim 10, wherein each of said hollow pipes on said base has a plug disposed therein, said plug being provided with two holes for two pins of said light-emitting element to extend thereinto, so that said light-emitting element is protected against moisture and dust.

15. An automatic wheel-driven generating means, comprising a base, a winding reel, left and right magnetic poles, a magnet holder, and a cap;
    said base being provided at a central area with an outward projected hollow column, at an outer side along a peripheral edge thereof with a groove, and on said outer side with one or more fixed hollow pipes radially project from said peripheral edge of said base, and said base being fixedly mounted on a wheel around an axle thereof by retaining members;
    said winding reel having a coil wound thereon, lead-out wires of said coil being separately connected to wires that are further separately connected to light-emitting elements disposed in said hollow pipes of said base;

said left and said right magnetic poles being two toroidal members located at two sides of said winding reel to enclose said winding reel between them, and having a plurality of equally spaced magnetic pole fins axially extended from an outer peripheral edge toward said winding reel, such that said magnetic pole fins alternate along an outer periphery of said winding reel, and an assembly of said winding reel and said left and said right magnetic poles being put around said hollow column on said base;

said magnet holder being an annular member having a round central bore and being located around said assembly of said winding reel and said left and said right magnetic poles without contacting with said assembly, and a magnetic ring being bonded; around an inner side of a circumferential edge of said magnet holder corresponding to said magnetic pole fins of said left and said right magnetic poles; and said cap being engaging into said central bore of said magnet holder and having a central axle hole for said axle to extend therethrough, so that said cap is fixedly mounted on said axle;

whereby when said wheel rotates, said left and said right magnetic poles mounted around said hollow column of said base rotate along with said wheel relative to said magnetic ring on said magnet holder that is fixedly mounted on said axle through said cap, and an induced current is produced to drive said light-emitting elements to automatically emit light without the need of any battery.

16. The automatic wheel-driven generating means as claimed in claim 15, wherein said hollow column on said base is provided along an outer rim with a plurality of spaced and outward extended catches for securely holding said assembly of said winding reel and said left and said right magnetic poles around said hollow column.

17. The automatic wheel-driven generating means as claimed in claim 15, wherein said central bore of said magnet holder is provided with an internal screw thread and said cap is provided with an external screw thread, and said cap is axially adjustably connected to said central bore of said magnet holder through engagement of said external screw thread with said internal screw thread.

18. The automatic wheel-driven generating means as claimed in claim 15, wherein said base is fixedly mounted on said wheel around said axle by extending a first end of each of said retaining members into said groove provided on said base, and guiding a second end of each of said retaining members through one or more spokes of said wheel before extending said second end into said groove.

19. The automatic wheel-driven generating means as claimed in claim 15, wherein said magnet holder is mounted around said assembly of said winding reel and said left and said right magnetic poles without contacting with said assembly by inserting a plurality of isolating plates into a plurality of slots spaced on a side surface of said magnet holder before said magnet holder is put around said assembly, so that said magnetic ring on said magnet holder and said magnetic poles do not magnetically attract one another before said magnet holder is correctly mounted around said axle, and said isolating plates being removed from said slots after said magnet holder having been correctly mounted around said axle.

20. The automatic wheel-driven generating means as claimed in claim 15, wherein each of said hollow pipes on said base has a plug disposed therein, said plug being provided with two holes for two pins of said light-emitting element to extend thereinto, so that said light-emitting element is protected against moisture and dust.

21. An automatic wheel-driven generating means, comprising a base, a winding reel, left and right magnetic poles, a magnet holder, and a cap;

said base being provided at a central area with an outward projected hollow column, at an outer side along a peripheral edge thereof with a groove, and on said outer side with one or more fixed hollow pipes radially project from said peripheral edge of said base, and said base being fixedly mounted on a wheel around an axle thereof by retaining members;

said winding reel having a coil wound thereon, lead-out wires of said coil being separately connected to wires that are further separately connected to light-emitting elements disposed in said hollow pipes of said base;

said left and said right magnetic poles being two toroidal members located at two sides of said winding reel to enclose said winding reel between them, and having a plurality of equally spaced magnetic pole fins axially extended from an inner peripheral edge toward said winding reel, such that said magnetic pole fins alternate along an inner periphery of said winding reel, and an assembly of said winding reel and said left and said right magnetic poles being put in said hollow column on said base;

said magnet holder being an annular member having a round central bore and being located in said assembly of said winding reel and said left and said right magnetic poles without contacting with said assembly while a magnetic ring bonded around an circumferential edge of said magnet holder corresponding to said magnetic pole fins of said left and said right magnetic poles; and said cap being engaging into said central bore of said magnet holder and having a central axle hole for said axle to extend therethrough, so that said cap is fixedly mounted on said axle;

whereby when said wheel rotates, said left and said right magnetic poles mounted in said hollow column of said base rotate along with said wheel relative to said magnets on said magnet holder that is fixedly mounted on said axle through said cap, and an induced current is produced to drive said light-emitting elements to automatically emit light without the need of any battery.

22. The automatic wheel-driven generating means as claimed in claim 21, wherein said hollow column on said base is provided along an outer rim with a plurality of spaced and inward extended catches for securely holding said assembly of said winding reel and said left and said right magnetic poles in said hollow column.

23. The automatic wheel-driven generating means as claimed in claim 21, wherein said central bore of said magnet holder is provided with an internal screw thread and said cap is provided with an external screw thread, and said cap is axially adjustably connected to said central bore of said magnet holder through engagement of said external screw thread with said internal screw thread.

24. The automatic wheel-driven generating means as claimed in claim 21, wherein said base is fixedly mounted on said wheel around said axle by extending a first end of each of said retaining members into said groove provided on said base, and guiding a second end of each of said retaining members through one or more spokes of said wheel before extending said second end into said groove.

25. The automatic wheel-driven generating means as claimed in claim 21, wherein each of said hollow pipes on said base has a plug disposed therein, said plug being provided with two holes for two pins of said light-emitting element to extend thereinto, so that said light-emitting element is protected against moisture and dust.

* * * * *